Feb. 28, 1928. 1,660,420
F. G. FOLBERTH ET AL
LIQUID LEVEL INDICATOR
Filed May 25, 1922
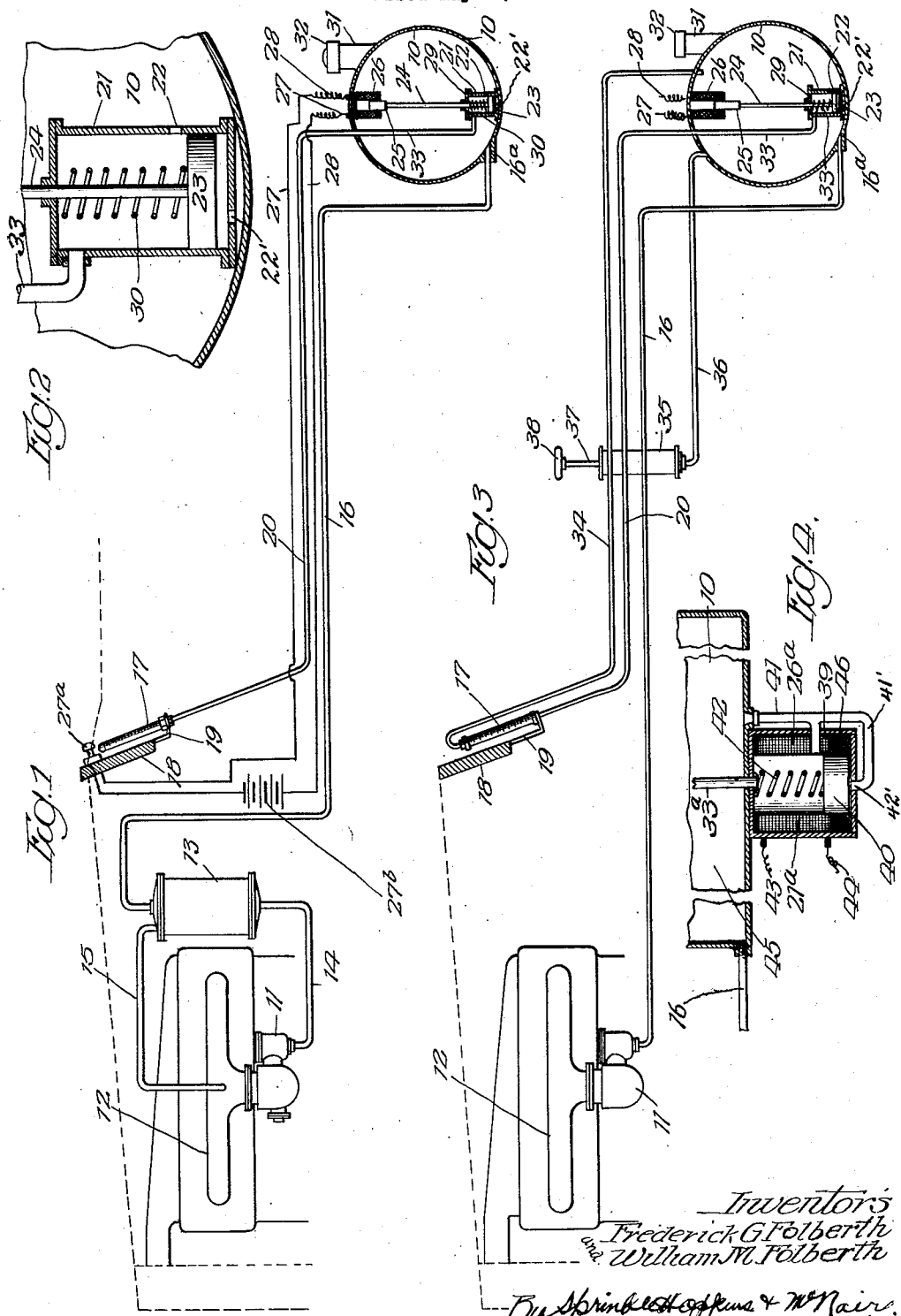
Inventors
Frederick G. Folberth
and William M. Folberth
By Sprinkle Hopkins & McNair
Attys Patented Feb. 28, 1928.

1,660,420

UNITED STATES PATENT OFFICE.

FREDERICK G. FOLBERTH AND WILLIAM M. FOLBERTH, OF CLEVELAND, OHIO.

LIQUID-LEVEL INDICATOR.

Application filed May 25, 1922. Serial No. 563,620.

The invention relates to indicators for liquid fuel supply systems for hydro-carbon motors.

It is the primary object of the invention to provide an indicating mechanism having a sight gauge that will accurately indicate whatever quantity of liquid fuel may be within the supply tank of a liquid fuel supply system of a hydro-carbon motor.

A further object of the invention is to provide improved means for positioning the gauge upon a vehicle so that it can be readily manipulated by the operator of the vehicle for indicating the quantity of liquid fuel in the supply tank thereof.

It is a further object of the invention to provide an improved liquid level indicating means comprising a gauge and connections between the same and the supply tank in which a portion of the liquid fuel is employed as an indicating medium by forcing a portion thereof upwardly in the gauge, thus eliminating the necessity of charging the gauge with a fluid separate and distinct from the liquid fuel or providing delicate and intricate mechanism for indicating the quantity of liquid fuel within the supply tank.

The invention is particularly adapted for use on automobiles or other motor operated conveyances as boats and aeroplanes and will be described as applied in connection with a liquid fuel operated motor therefor. It frequently happens that the driver of an automobile or other motor operated conveyance exhausts the liquid fuel from the supply tank unexpectedly at a point remote from a source of fuel supply and is unable to further operate the motor until a fresh supply of fuel can be obtained and the purpose of the invention is to provide an indicator that will accurately indicate the quantity of fuel within the fuel supply tank so that the operator of the motor may be apprised of the quantity of fuel within the fuel supply tank, thus avoiding the danger of completely exhausting the liquid fuel from the fuel supply tank and thereby becoming stranded at a point remote from a source of fuel supply.

Other objects of the invention will appear from the following description which is directed to the preferred embodiment of the invention, reference being had to the accompanying drawings which form a part of the specification, the features of novelty being pointed out more particularly in the appended claims.

In the drawings, Fig. 1 is a schematic view showing the liquid fuel supply system for a hydro-carbon motor of an automobile with the invention applied thereto.

Fig. 2 is an enlarged detail view showing the cylinder and piston for forcing the liquid fuel into the gauge, a fragment of the supply tank also being shown.

Fig. 3 is a schematic view similar to Fig. 1 showing a modified form of the invention.

Fig. 4 is a detail sectional view of a further modified form of the invention.

In the embodiment of the invention as illustrated in the drawings the improved indicator mechanism for indicating the quantity of liquid fuel within the supply tank is shown as applied to the tank of a liquid fuel supply system for hydro-carbon motors of a conventional type.

Referring to the drawings, for a more detailed description of the invention, reference character 10 indicates the liquid fuel supply tank, which in the drawings is, although not necessarily so, shown as carried at the rear of an automobile. This supply tank 10 is shown as below the level of the carburetor 11 of a motor, the intake manifold 12 of which communicates with the carburetor for supplying gaseous fuel to the motor. A vacuum or auxiliary fuel tank 13 of conventional form is placed as shown in the drawings for feeding liquid fuel from tank 10 to the carburetor 11 by gravity through the usual feed line 14. In common practice where vacuum or auxiliary tanks of the type as designated by reference character 13 are used, the suction produced in the intake manifold by the action of the motor pistons is utilized for drawing the liquid fuel from the low level supply tank 10 to the vacuum or auxiliary fuel tank 13 through the pipe 15 leading from the intake manifold 12 to the vacuum or auxiliary fuel tank 13, the connection between the vacuum or auxiliary fuel tank 13 and the supply tank 10 being formed through the liquid fuel line 16.

The fuel line 16 preferably enters the supply tank 10 as shown in the drawing at a point adjacent the bottom of the tank as at 16ª for the purpose of being able to quite completely exhaust the liquid fuel within the tank when vacuum is formed in the fuel line 16 in the manner before referred to.

The fuel line 16 however, may be introduced into the supply tank 10 through the top thereof and projected downwardly through the tank to a point adjacent the bottom thereof, if preferred. In the form of the invention as illustrated in Figs. 1 and 2 a graduated gauge 17 is secured to the instrument board 18 of the automobile by bracket 19. Pipe 20 forms a connection between the lower extremity of gauge 17 and cylinder 21 within the supply tank 10. Pipe 20 is preferably introduced into tank 10 from the top thereof as illustrated in Fig. 1.

The means for forcing liquid fuel from the supply tank 10 upwardly to and into gauge 17 for the purpose of indicating the quantity of liquid fuel within the tank will now be described.

A cylinder 21 having cover 29 is placed within the tank 10 and secured to the bottom thereof in any suitable manner. Within the cylinder and adapted to have reciprocal movement therein is piston 23. At a point immediately above the upper face of piston 23 when at its lowermost position within the cylinder is port 22 through the wall of the cylinder for admission of liquid fuel from the supply tank into the cylinder and above the upper face of piston 23. In the bottom of the cylinder is another port 22' which permits the admission of liquid fuel from the supply tank beneath the piston 23. The object of this port 22' in the bottom of the cylinder is to eliminate the formation of a vacuum which in turn would prevent the operation of the piston. Piston 23 has affixed to the upper face thereof rod 24 which may be made of any suitable material such as brass, for example, and to the upper extremity of the rod is affixed a soft iron solenoid core 25, which is adapted to move upwardly within the solenoid 26 secured to the top wall of the supply tank and preferably on the interior thereof. Circuit wires 27, 28 leading from battery 27ʰ to the solenoid are provided for energizing the solenoid and are preferably brought to a convenient point for control of the circuit by the operator of the device, as for example, the instrument board 18, where the wires are shown leading to the switch mechanism operated by push button 27ª, preferably of the type of switch normally open and adapted to close the circuit by pressure upon the push button 27ª. The soft iron core 25 affixed to the upper extremity of rod 24 extends a short distance into the central opening of solenoid 26 in order that the solenoid when energized may act as a magnet upon the core and draw the piston upwardly of the cylinder 21. A helical spring 30 surrounds the lower end of piston rod 24 being inserted between the upper side of the piston 23 and the underside of the top closure 29 of the cylinder, thus tending normally to force the piston downwardly of the cylinder and being effective to depress the piston to the lowermost extremity of its movement in the cylinder whenever the magnet is de-energized. While the relative diameter of the interior or recording portion of the gauge 17 in relation to the pipe 20 and the piston displacement may vary, thus necessitating variations in the graduation of the recording scale thereon for different installations, it is desirable in constructing the apparatus herein described that the normal and maximum displacement of the piston, as determined by the maximum amount of fluid that may be discharged by a single maximum discharge stroke of the piston, shall be exactly sufficient to fill the interior of the pipe line 20 and cause the column of fluid therein to stand at what will preferably be marked as the zero graduation on the reading glass or indicator gauge 17. It will be seen that when the magnet 26 is de-energized and the piston depressed in the cylinder the inlet port 22 will be uncovered so that the fluid within the tank 10 may enter the cylinder 21 through inlet port 22 and will rise in the cylinder 21 and the vertical line 33 of pipe 20 to the level of the liquid within the tank. Assuming, for example, that the level of the liquid within the tank 10 is only sufficient to fill the cylinder 21 above the piston but does not rise above the lower extremity of the vertical portion 33 of the pipe 20, the actuation of the piston by the means described will result in the liquid column within the gauge coming only to the zero reading, thus indicating to the operator that the supply of fluid fuel is almost exhausted. Any increment of fuel within the tank 10 above the amount of the before described reading on the gauge glass will obviously, prior to the actuation of the piston cause the fluid column to stand to a corresponding height in the vertical pipe 33 above such zero reading height, as described, and hence, when the piston 23 is actuated the volume of fluid standing within the vertical portion 33 of the line 20 will be added to the zero reading of the fluid column in the gauge glass 17. If the diameter of the interior of the gauge glass 17 equals the diameter of the interior of the vertical line 33 of pipe obviously, any increment of liquid fuel within the tank above the amount necessary for a zero reading on the gauge glass will increase the height of the fluid column within the gauge glass an equal amount and the gauge glass may be accordingly graduated to indicate the fuel tank capacity. Obviously, variations of the capacity of tank 10, the vertical pipe 33 and the capacity of the interior opening in the gauge glass 17, will require corresponding corrections on the graduated readings of the gauge glass to indicate the correct tank capacity. As long as the piston 23 remains in its elevated position, which will be so long as the magnet continues to be energized by the closing of the switch 27ª, the fluid will be retained in its elevated position in the line, but when the switch 27ª is opened and the solenoid de-energized the spring 30 will return the piston 23 to its lowermost point of movement within the cylinder 21, causing the fluid in the gauge glass 17 and the pipe 20 to settle within the cylinder above the piston until the instant that the piston uncovers port 22 at which time, obviously, the height of liquid within the vertical pipe 33 of pipe 20 and cylinder 21 will return to the level of liquid within the tank.

In Fig. 3 is shown a modified form of the invention which is adaptable to gravity or compression liquid fuel supply systems for hydro-carbon motors and as shown in the drawings is applied to an automobile. In this form of the invention a return pipe 34 is provided which connects the upper extremity of gauge 17 with fuel supply tank 10 and is for the purpose of equalizing pressure within the gasoline tank and in the gauge and its connections with the tank. Pressure for feeding fuel direct to the carburetor may be obtained by means of the hand operated pump illustrated in which the barrel is designated by the reference character 35 connected with the tank by air line 36, 37 being the piston rod and 38 the handle thereof.

In Fig. 4 is shown a modified form of the invention of Figs. 1 to 3 inclusive, in which the piston for actuating the fluid column and its operating means is shown installed on the outside of the fuel supply tank, in this instance being attached to the bottom of the tank. In this modified form of the invention the solenoid 26ª is supported in a casing 39 affixed in any suitable manner to the bottom of tank 10. Cylinder 21ª supported within the solenoid 26ª carries piston 40 therein which is adapted to have reciprocal movement within the cylinder. By-pass 41 leading from the bottom of the supply tank 10 through the side wall of cylinder 21ª at a point immediately above the plane of the upper face of piston 40 when at its lowermost point of movement within the cylinder is for the purpose of conducting liquid fluid from the tank 10 into and filling the cylinder 21ª. The by-pass 41 has a branch extension 41' which enters the bottom of the casing 39 as shown at 42' and communicates with the cylinder 21ª below the piston 40. This extension 41' permits the liquid to flow into the cylinder 21ª below the piston 40 as the piston is raised by the solenoid. Helical spring 42 interposed between the top of casing 39 and the upper face of piston 40 is attached to the top of the casing 39 and piston 40 at its respective ends and tends to force the piston downwardly of cylinder 21ª when solenoid 26ª is de-energized. Circuit wires 43, 44 are provided for energizing solenoid 26ª. In this modified form of the invention the piston 40 within cylinder 21ª is formed of any suitable material such as soft iron, for example, to form a core for co-operation with the solenoid 26ª. In this form of the invention the pipe 33ª is tapped through the tank 10 at a point preferably at the top thereof, as at 45. In operation the piston forming the core for solenoid 26ª for co-operation therewith will be drawn upwardly within cylinder 21ª when the solenoid is energized, thus functioning as a pump piston and forcing the liquid fuel upwardly and through the tube 33ª, as described, with relation to the device, as shown in Fig. 1. Intermediate the bottom of casing 39 and the bottom of solenoid 26ª and surrounding cylinder 21ª is placed an insulating element 46. Obviously, the circuit controlling this solenoid as well as the circuit controlling the solenoid shown in Fig. 3 will be provided with suitable means, as illustrated by the switch button 27ª of Fig. 1, for operating the solenoid, and it will be seen that the invention as illustrated in the forms of Figs. 1, 3 and 4 will furnish a ready and convenient means by which the operator of a motor car, for example, may quickly determine the height of fuel within the supply tank by causing the gauge mechanism to register the same, and it will be further seen that a reading from the gauge may be obtained at any time when the gauge is visible to the operator by first causing the measuring piston to be actuated by the closing of the circuit for actuating the solenoid, whereupon in the manner described, a correct reading of the height of the fuel fluid within the supply tank should be correctly recorded in the gauge and readable therein as in an ordinary liquid gauge or thermometer. Obviously, the gauge may be suitably graduated as may be desired and in correspondence with the capacity of the tank in connection with which it is to be used.

In order that the invention might be understood, we have shown the details of the preferred embodiment of our invention, but it is not desired to be limited to the mere details of construction, for it will be apparent that persons skilled in the art may resort to various modifications without departing from the purpose and spirit of the invention.

We claim:

1. In a liquid gauge for liquid fuel supply systems for hydro-carbon motors, the combination with a container, of a cylinder having an opening in the lateral wall thereof near one end of the cylinder, and in communication with the interior of the container, a piston normally positioned at said end of the cylinder and adapted to close the opening when moved towards the other end, there being an opening having a venting function at the said one end of the said cylinder on one side of the piston, means for compressing air within the container, a gauge, a pipe connecting the gauge with the interior of the cylinder, and a pipe connecting the gauge with the interior of the container exteriorly of said cylinder whereby to equalize the air pressure in the said container and gauge.

2. In a liquid gauge, the combination with a container, of a closed cylinder affixed to the bottom of the container, a piston carried within the cylinder and adapted to have reciprocal movement therein, there being means for establishing communication from the interior of the container to the interior of the cylinder at points immediately above and below the corresponding faces of the piston when at its lowest point of movement within the cylinder, a gauge spaced from the container, a pipe communicating with the top of the cylinder and the bottom of the gauge, a piston rod adapted to have free reciprocal movement through the top of the cylinder and affixed to the piston, a core carried by the upper extremity of the rod, a solenoid carried by the top of the container and surrounding the upper part of said core, a spring surrounding the lower portion of the piston rod and interposed between the upper face of the piston and the inner face of the top of the cylinder, and means for controlling the energization of the solenoid.

3. In a liquid gauge, the combination with a tank of a cylinder having communication with the tank and being adapted to receive liquid therefrom, a piston mounted to reciprocate in said cylinder, a gauge spaced from the tank, a pipe connecting the cylinder and the gauge, and actuated means for reciprocally moving the piston within the cylinder and pumping said liquid therefrom, the displacement of said piston within the cylinder being substantially equal to the capacity of the pipe connecting the tank and the gauge.

4. In a liquid gauge, the combination with a tank of a cylinder having communication with the tank and being adapted to receive liquid therefrom, a piston mounted to reciprocate in said cylinder, a gauge spaced from the tank, a pipe connecting the cylinder and the gauge, and actuated means for reciprocally moving the piston within the cylinder and pumping said liquid therefrom, the said gauge being provided with a zero designation and the capacity of the pipe connecting the cylinder and the gauge including the capacity of the gauge to the zero designation thereon being equal to the maximum displacement of the piston.

5. In a liquid gauge, the combination with a container, of a cylinder within the container and having an opening in the lateral wall thereof near one end of the cylinder, a piston normally positioned at said end and adapted to close the opening when moved toward the other end, a gauge spaced from the container, a pipe connecting the gauge and the cylinder, and an electro-magnet spaced from one end of the cylinder and adapted, when energized, to draw the piston toward it.

6. In a liquid gauge, the combination with a tank of a cylinder having communication with the tank, a piston in said cylinder, a gauge spaced from the tank, a pipe connecting the cylinder and gauge, an electro-magnetic means for reciprocally moving the piston within the cylinder, the displacement of said piston within the cylinder being substantially equal to the capacity of the pipe connecting the cylinder and gauge.

7. In a liquid gauge, the combination with a tank, of a cylinder and a piston therein, said cylinder having an opening in the wall thereof for communication with the tank, a gauge spaced from the tank, a pipe line connecting the gauge with the interior of the cylinder, an electro-magnet operatively related to said piston, an electric circuit for energizing said electro-magnet, and means for opening and closing said circuit for controlling the energizing of said electro-magnet.

In testimony whereof we have signed our names to this specification.

FREDERICK G. FOLBERTH.
WILLIAM M. FOLBERTH.